United States Patent
Tanaka

(10) Patent No.: US 7,926,704 B2
(45) Date of Patent: Apr. 19, 2011

(54) METHOD, APPARATUS AND PROGRAM STORAGE DEVICE FOR PROVIDING ELECTRONIC DATA DELIVERY

(75) Inventor: Hiroyuki Tanaka, Kanagawa-Ken (JP)

(73) Assignee: International Business Machines Corporation, Armonk, NY (US)

( * ) Notice: Subject to any disclaimer, the term of this patent is extended or adjusted under 35 U.S.C. 154(b) by 1326 days.

(21) Appl. No.: 11/284,637

(22) Filed: Nov. 22, 2005

(65) Prior Publication Data
US 2006/0129686 A1 Jun. 15, 2006

(30) Foreign Application Priority Data
Nov. 25, 2004 (JP) .................. 2004-340772

(51) Int. Cl.
*G06F 17/00* (2006.01)
(52) U.S. Cl. .............. 235/375; 705/26; 705/59; 725/46; 726/9
(58) Field of Classification Search .................. 235/375; 705/26, 59; 725/46; 726/9
See application file for complete search history.

(56) References Cited

U.S. PATENT DOCUMENTS

| | | | |
|---|---|---|---|
| 7,328,189 B2 | 2/2008 | Ling | |
| 7,376,621 B1 | 5/2008 | Ling | |
| 2002/0002538 A1 | 1/2002 | Ling | |
| 2003/0135458 A1 | 7/2003 | Tadano et al. | |
| 2003/0217288 A1 | 11/2003 | Guo et al. | |
| 2007/0162967 A1* | 7/2007 | de Jong et al. | 726/9 |
| 2009/0204808 A1 | 8/2009 | Guo et al. | |

FOREIGN PATENT DOCUMENTS

| | | |
|---|---|---|
| CN | 1411585 | 4/2003 |
| JP | 2001216441 | 3/1991 |
| JP | 2002024651 | 9/1991 |
| JP | 2002305513 | 6/1992 |
| JP | 2004048679 | 9/1993 |
| JP | 2001216441 | 8/2001 |
| JP | 2001-297242 | 10/2001 |
| JP | 2002024651 | 1/2002 |
| JP | 2002-197221 | 7/2002 |

(Continued)

OTHER PUBLICATIONS

Patent Abstract for JP2004048679, published on Sep. 28, 1993, 1 pg.

(Continued)

*Primary Examiner* — Allyson N Trail
(74) *Attorney, Agent, or Firm* — William Konrad; Konrad Raynes and Victor LLP

(57) ABSTRACT

The system includes a wholesale server which issues electronic data such as an electronic ticket, an agent server which performs selling processing of the electronic data, and a client terminal which acquires the electronic ticket and the like by communicating with the wholesale server and the agent server. The agent server attaches to an electronic data delivery request for electronic data such as a ticket from the client terminal, a token for an access to the wholesale server or another agent server positioned directly above the agent server, and transmits the request back to the client terminal. The client terminal transmits the electronic data delivery request with the token received from the agent server to the wholesale server. Thereafter, the wholesale server issues electronic data such as an electronic ticket in response to the electronic data delivery request with the token.

23 Claims, 8 Drawing Sheets

FOREIGN PATENT DOCUMENTS

| | | |
|---|---|---|
| JP | 2002305513 | 10/2002 |
| JP | 2004048679 | 2/2004 |

OTHER PUBLICATIONS

Patent Abstract for JP2002305513, published on May 24, 1992, 1 pg.
Patent Abstract for JP2001216441, published on Mar. 4, 1991, 1 pg.
Patent Abstract for JP2002024651, published on Sep. 10, 1991, 1 pg.
Abstract and Machine Translation for JP2004-048679, published on Feb. 12, 2004, 42 pp.
Abstract and Machine Translation for JP2002-305513, published on Oct. 18, 2002, 30 pp.
Abstract and Machine Translation for JP2001-216441, published on Aug. 10, 2001, 41 pp.
Abstract and Machine Translation for JP2002-024651, published on Jan. 25, 2002, 12 pp.
Chinese Office Action for Application 2005101235109, dated Dec. 25, 2009, 6 pgs.
Abstract for CN1411585, published Apr. 16, 2003, 1 pg.

* cited by examiner

METHOD, APPARATUS AND PROGRAM STORAGE DEVICE FOR PROVIDING ELECTRONIC DATA DELIVERY

BACKGROUND OF THE INVENTION

1. Field of the Invention

This invention relates in general to a system for delivering electronic data by a server according to an access from a client, and more particularly to a method, apparatus and program storage device for providing electronic data delivery

2. Description of Related Art

Many transactions today involve the delivery of electronic data. Such electronic data may include an electronic ticket or other digital content such as music, videos, official personal resident information, and the like. Using ticketing as an example, tickets are used to control admission to a wide variety of events such as concerts, plays, sports contests, and other performances. Attending an event generally requires purchasing a ticket in advance. Tickets are traditionally provided by the venue hosting the event and are sold at the venue's box office. Tickets are also available through ticket distributors, in coordination with the hosting venue and the event promoter. Aside from the venue box office, tickets are also available through ticket outlets, ticket brokers, telephone sales, remote ticket printing applications, ticket kiosks and Internet web sites. Thus, ticket sales are no longer strictly a mechanical function. Ticketing systems have evolved to make use of computer systems in various phases of the ticket generation, issuance and validation processes.

One method for presenting tickets for sales is the consignment method. Tickets may be sold on a consignment basis by use of agents and the like. For example, in the soccer's World Cup, Federation Internationale de Football Association (FIFA) allocates tickets to ticket handlers in other countries through sole agents, e.g., wholesalers. Accordingly, people who want to purchase the tickets acquire the tickets from the ticket handlers in those countries. Depending on circumstances, the agent further sets an agent of its own, and thus a mode of sales in which a form of consignment is hierarchized into a several stages, such as a subsidiary agent and a sub-subsidiary agent, may be adopted. However, by use of such a sales method, allocation of tickets cannot be flexibly changed if a predetermined agent has too many tickets or runs out of tickets. Thus, sales efficiency is poor.

In recent years, along with development of information processing technologies by computers, efficient ticket sales have been achieved by use of digitized tickets, e.g., electronic tickets. The electronic tickets are sold in a system formed by installing servers in a wholesaler, each agent and an end dealer, respectively, and communicating those servers in a hierarchical fashion via a network, e.g., via a tree structure. Thus, a wholesaler corresponding to a root node can perform consolidated management of sales situations of all the tickets. Such examples may be found in Patent Documents: Japanese Patent Laid-open Publication No. 2002-197221 and Japanese Patent Laid-open Publication No. 2001-297242. The consolidated management of the sales situations of the tickets makes it possible to avoid a situation where a specific agent has too many tickets or runs out of tickets.

In such a tree structure, a person who wants to buy a ticket operates a client terminal to issue a ticket purchase request. Thereafter, this request is transmitted up a branch to a server of a wholesaler. The server of the wholesaler issues a ticket in response to the request and returns a response, which is issued back down the path through which the ticket purchase request is transmitted. Subsequently, procedures such as payment are performed by the client terminal. Thus, the ticket is sold to the person who wants to buy the ticket.

As described above, management of sales of an electronic ticket (hereinafter simply described as a ticket) by a network system makes it possible for a wholesaler to perform consolidated management of sales situations of all tickets even if the ticket is sold by use of a number of agents and dealers. Thus, it is possible to avoid a situation where a specific agent has too many tickets or runs out of tickets. However, in the case of a network system in which servers are hierarchically coupled simply from the wholesaler to an end dealer according to a form of a consignment contract for ticket sales, there is a problem that a load on a server positioned in a lower level is increased.

Specifically, in the system described above, all the servers existing on a path from a client terminal, by which a ticket purchase request is issued, to a top server cannot finish a transaction until the request issued reaches the top server and is processed. Thus, the lower the server is positioned, the longer it takes to finish the transaction. Accordingly, the load of the server is increased. This technical problem concerning issuance of the electronic ticket similarly exists in delivery of various electronic data (digital contents, for example, music, videos, official personal resident information, and the like).

As a measure to reduce a load on the lower level server, it is considered to couple servers of all agents directly to a server of a wholesaler regardless of a form of each agent in a contract (a subsidiary agent, a sub-subsidiary agent and the like). However, in such a system, the servers of all the agents are managed by the server of the wholesaler. Thus, the agent has to obtain agreement from the wholesaler for server communication each time the agent increases or reduces its own subsidiary agents, which is complicated. Moreover, each of the agents has to provide information concerning its own subsidiary agent to the wholesaler or a high-level agent. The above situation may not be favorable depending on a form of an agent contract.

It can be seen that there is a need for a system for delivering electronic data by a plurality of agent servers under consolidated management by a wholesale server, and a method of delivering the electronic data.

SUMMARY OF THE INVENTION

To overcome the limitations in the prior art described above, and to overcome other limitations that will become apparent upon reading and understanding the present specification, the present invention discloses a system for delivering electronic data by a plurality of agent servers under consolidated management by a wholesale server, and a method of delivering the electronic data.

The present invention solves the above-described problems by providing a system for delivering electronic data that reduces a load of agent servers in a transaction at the time of issuing an electronic ticket in a system. The system may include a plurality of servers and in which the ticket is issued under consolidated management by a specific server. By providing a flexible electronic data delivery system, a system configuration may be changed by a specific agent increasing or reducing its own subsidiary agent.

An electronic data delivery system in accordance with an embodiment of the present invention includes a communication part capable of performing data communication with a remote module, said performing data communication including receiving input data from said remote module and a processor, coupled to the communication part, capable of generating output data in response to receiving said input data, wherein the input data comprises an electronic data deliver request and an access token for allowing communication through consolidated management of access control.

In another embodiment of the present invention, a program storage device is provided. The program storage device includes program instructions executable by a processing device to perform operations for delivering electronic data by a system in which a plurality of servers forming a tree structure perform delivery processing of electronic data under consolidated management by a server corresponding to a root node. The operations include receiving input data associated with an electronic data delivery request for electronic data, wherein the input data comprises an electronic data delivery request for the electronic data and an access token for allowing communication through the consolidated management by the server corresponding to a root node and generating output data in response thereto for forwarding to the remote module via the communication part.

A method of delivering electronic data by a system in which a plurality of servers forming a tree structure perform delivery processing of electronic data under consolidated management by a server corresponding to a root node is also provided.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a system for delivering electronic data by a plurality of agent servers under consolidated management by a wholesale server, and a method of delivering the electronic data. The system for delivering electronic data reduces a load of agent servers in a transaction at the time of issuing an electronic ticket in a system. The system may include a plurality of servers and in which the ticket is issued under consolidated management by a specific server. By providing a flexible electronic data delivery system, a system configuration may be changed by a specific agent increasing or reducing its own subsidiary agent.

Figure 1B:
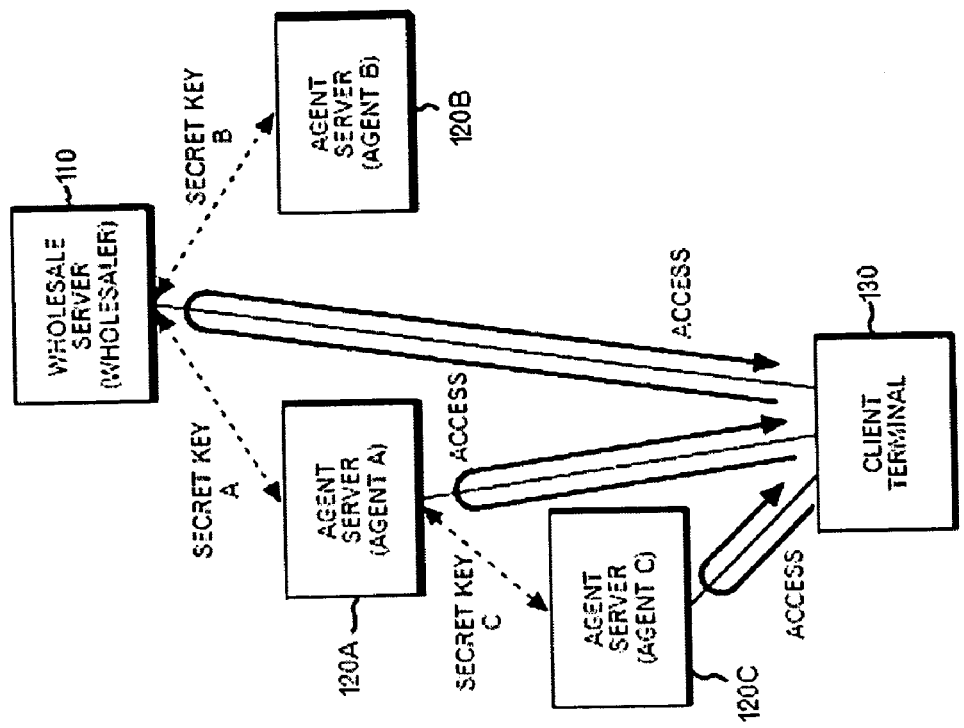
FIG. 1B is a diagram explaining a ticket selling system according to an embodiment of the present invention.
Figure 1A:
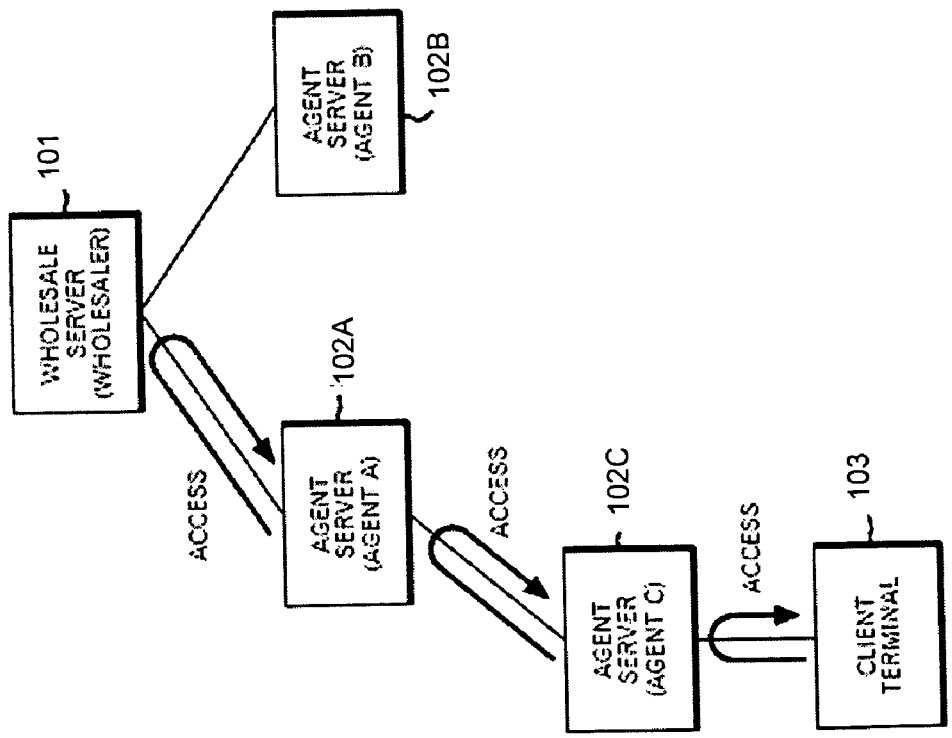
FIG. 1A is a diagram explaining a method of selling an electronic ticket in a system formed by hierarchically coupling servers.

FIG. 1A is a diagram explaining a method of selling an electronic ticket in a system formed by hierarchically coupling servers. In FIG. 1A, a person who wants to buy a ticket operates a client terminal 103 to issue a ticket purchase request. Thereafter, this request is transmitted to a server 102C of an agent C from the client terminal 103. The server 102C of the agent C transmits the request to a server 102A of an agent A positioned above server 102C in a hierarchical structure of the system. After being similarly and sequentially transmitted upward in the hierarchical structure, the request finally reaches a server 101 of a wholesaler. Similarly, another branch having server 102B of agent B may be coupled to server 101. The server 101 of the wholesaler issues a ticket in response to the request and returns a response. This response reaches the client terminal 103 by tracking back the path through which the ticket purchase request is transmitted. Subsequently, procedures such as payment are performed by the client terminal 103. Thus, the ticket is sold to the person who wants to buy the ticket.

As described above, management of sales of an electronic ticket (hereinafter simply described as a ticket) by a network system makes it possible for a wholesaler to perform consolidated management of sales situations of all tickets even if the ticket is sold by use of a number of agents and dealers. Thus, it is possible to avoid a situation where a specific agent has too many tickets or runs out of tickets. However, in the case of a network system in which servers are hierarchically coupled simply from the wholesaler to an end dealer according to a form of a consignment contract for ticket sales, there is a problem that a load on a server positioned in a lower level is increased.

Specifically, in the system described above, all the servers existing on a path from a client terminal, by which a ticket purchase request is issued, to a top server cannot finish a transaction until the request issued reaches the top server and is processed. For example, in FIG. 1A, the server 102C of the agent C continues its transaction until a request received from the client terminal 103 reaches the server 101 of the wholesaler and a response thereto is transmitted to the client terminal 103 through the server 102C of the agent C. Thus, the lower the server is positioned, the longer it takes to finish the transaction. Accordingly, the load of the server is increased. This technical problem concerning issuance of the electronic ticket similarly exists in delivery of various electronic data (digital contents, for example, music, videos, official personal resident information, and the like).

FIG. 1B is a diagram explaining a ticket selling system according to an embodiment of the present invention. As shown in FIG. 1B, the system of this embodiment includes: a wholesale server 110 which is a server of a wholesaler; agent servers 120A-C which are servers of agents; and a client terminal 130 coupled to the wholesale server 110 and the respective agent servers 120A-C via a network. A relationship between the wholesale server 110 and each of the agent servers 120A-C has a hierarchical structure (tree structure) corresponding to a form of a consignment contract between the wholesaler and the agent. Specifically, in the tree structure, the wholesale server 110 is set as a root node, an agent server 120A and/or 120B of an agent making a consignment contract directly with the wholesaler is positioned directly below the wholesale server 110, and an agent server 120C of a subsidiary agent making a consignment contract with the agent 120A is positioned further below the agent 120A. However, the wholesale server 110 and the respective agent servers 120 A-C do not have to be directly coupled to each other via the network. In FIG. 1B, both of the agent servers 120A and 120B are positioned directly below the wholesale server 110 and are in the same level of hierarchy. Moreover, the agent server 120C is in a level of hierarchy lower than that of the agent server 120A.

Although FIG. 1B shows only one client terminal 130 coupled to the agent server 120C, a plurality of the client terminals 130 may actually exist. Moreover, the client terminal 130 is not necessarily coupled to only the agent server 120C in the lowest level of the hierarchical structure, but is also coupled to the agent server 120A, which exists in the intermediate position of the hierarchical structure or to the wholesale server 110. For communication between the client terminal 130 and the agent servers 120A or the wholesale server 110, a wide area network using a public line, for example, can be used.

In this embodiment, each of the agent servers 120A-C issues a token for an access to a server in a level higher than its own when receiving a ticket purchase request from the client terminal 130, and transmits the token back to the client terminal 130. Thereafter, the client terminal 130 accesses the agent server in a higher level by use of the token and transmits the ticket purchase request. By repeating the operation described above, the client terminal 130 finally transmits the ticket purchase request directly to the wholesale server 110 and obtains a ticket.

In the example of FIG. 1B, first, a ticket purchase request is transmitted to the agent server 120C from the client terminal 130, and a token for an access to the agent server 120A is transmitted back to the client terminal 130 from the agent server 120C. Next, the ticket purchase request is transmitted together with the token acquired from the agent server 120C to the agent server 120A from the client terminal 130. Thereafter, a token for an access to the wholesale server 110 is transmitted back to the client terminal 130 from the agent server 120A. Finally, the ticket purchase request is transmitted together with the token acquired from the agent server 120A directly to the wholesale server 110 from the client terminal 130. Subsequently, the wholesale server 110 issues a ticket corresponding to the purchase request and transmits the ticket to the client terminal 130.

Moreover, in this embodiment, at least a part of the tokens issued by the agent servers 120A-C is encrypted. The wholesale server 110 and each of the agent servers 120 A-C share unique secret keys, respectively, with the servers positioned directly therebelow (in other words, which have immediate relationships therewith). Encryption of the tokens is performed according to secret key codes using those secret keys.

In the example of FIG. 1B, the wholesale server 110 and the agent server 120A share a unique secret key A. Similarly, the wholesale server 110 and the agent server 120B share a unique secret key B. Moreover, the agent servers 120A and 120C share a unique secret key C. Therefore, only the agent server 120A can interpret the token issued by the agent server 120C, and only the wholesale server 110 can interpret the token issued by the agent server 120A.

In this embodiment, two servers sharing a specific secret key as described above are regarded to have a relationship of trust therebetween. Thus, in the hierarchical structure of the respective servers, which is established based on the form of the consignment contract between the wholesaler and each of the agents, two servers having an immediate hierarchical relationship have the relationship of trust. Thus, the wholesale server 110 and the respective agent servers 120A-C in this embodiment, which are not necessarily coupled to each other via the network, maintain the hierarchical structure by use of the relationship of trust.

Figure 2:
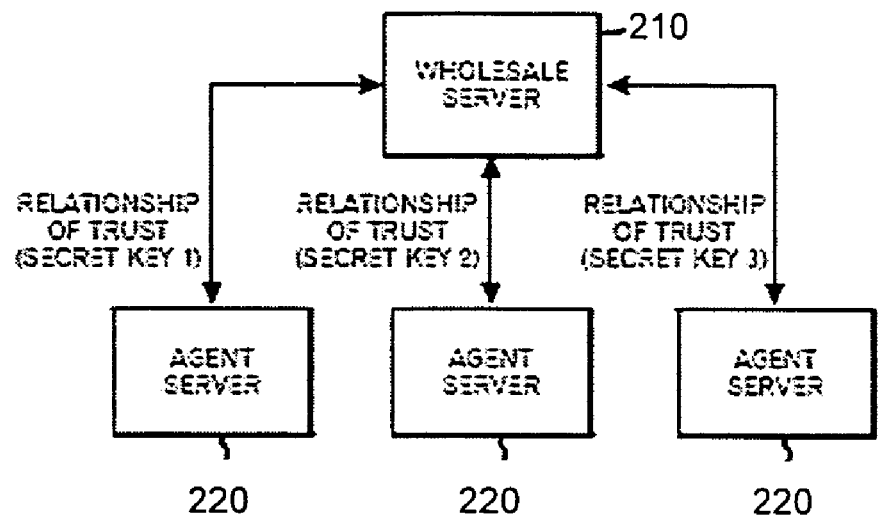
FIGS. 2A and 2B are diagrams explaining a relationship of trust between a wholesale server and agent servers in the embodiment.
Figure 2:
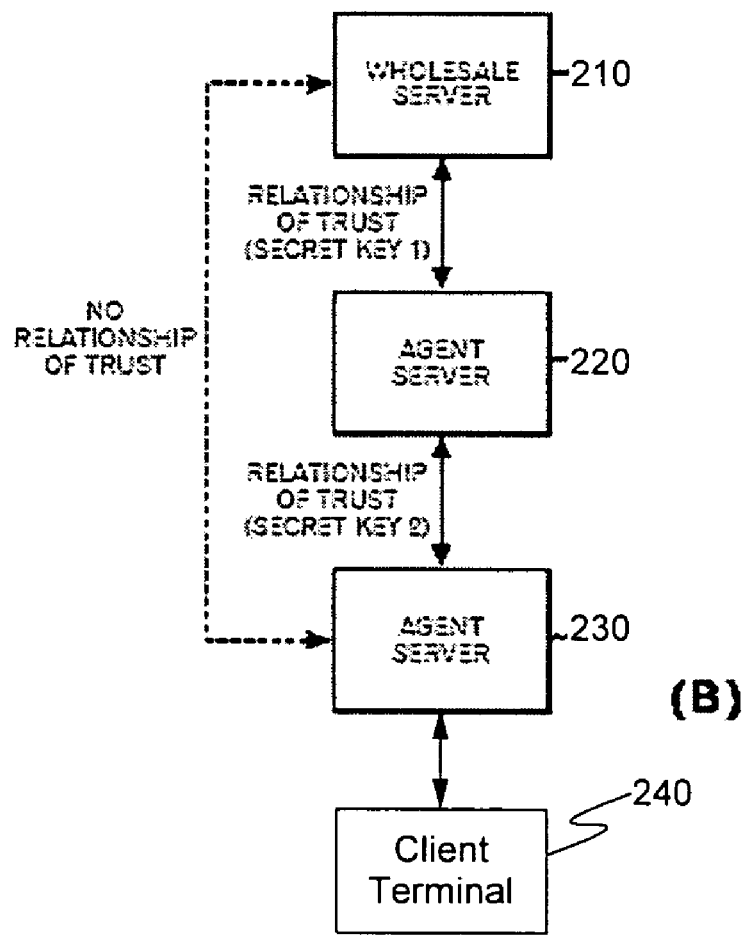

FIGS. 2A and 2B are diagrams explaining the relationship of trust between the wholesale server 210 and each of the agent servers 220 in the embodiment. As for the hierarchical structure in the ticket selling system of this embodiment, the simplest form thereof is one in which the wholesale server 210 is positioned in the highest level and all the agent servers 220 are positioned directly below the wholesale server 210 (in other words, the wholesaler and all the agents have direct consignment relationships). In this case, as shown in FIG. 2A, each of the agent servers 220 and the wholesale server 210 establish the relationship of trust by sharing a unique secret key.

Moreover, each of the agents can set an agent of its own (a subsidiary agent) by making a consignment contract. Accordingly, the agent servers 220 of the respective agents also come to have a hierarchical structure. Thus, the hierarchy of the whole system is deepened. However, as shown in FIG. 2B, agent server 220 may establish the relationship of trust by sharing the secret key only with the agent server 230 directly therebelow. The client terminal 240 reaches the wholesale server 210 by accessing the agent server 220 in a higher level by use of the token issued by the agent server 230, and thus can obtain a ticket. Specifically, in this embodiment, although the ticket is issued under consolidated management by the wholesale server 210, the wholesale server 210 and the agent server 220 in the higher level do not have to know to which servers therebelow are coupled. Therefore, each of the agents can arbitrarily and easily increase or reduce its own subsidiary agent without giving notice to the wholesale server and the agent in the high level.

In the system of this embodiment, the agent server 220 receives a ticket purchase request from the client terminal 230. Meanwhile, the agent server 220 of the agent having a subsidiary agent 230 in the lower level receives a request with a token issued by the agent server 230 of the subsidiary agent or receives a request without the token. In the following description, for simplicity, the agent server 220 having its own subsidiary agent 230 is called an intermediate agent, and the agent 230 having no subsidiary agent of its own (that is, receiving only a request without a token) is called a terminal agent. In the example shown in FIG. 1B, the agent A is the intermediate agent, and the agents B and C are the terminal agents.

Moreover, in the system of this embodiment, the agent server 230 that has received the ticket purchase request without the token from the client terminal 240 provides ticket sales services (including payment). Meanwhile, management services such as issuance, cancellation and inquiries of a ticket are given under consolidated management by only the wholesale server 210. Note that the wholesale server 210 itself can also sell a ticket by directly receiving the request without the token from the client terminal 240. However, for simplicity, the following description will be given by assuming that the wholesale server 210 gives only the management services and only the agent server 230 has distributorship for the ticket.

Figure 3:
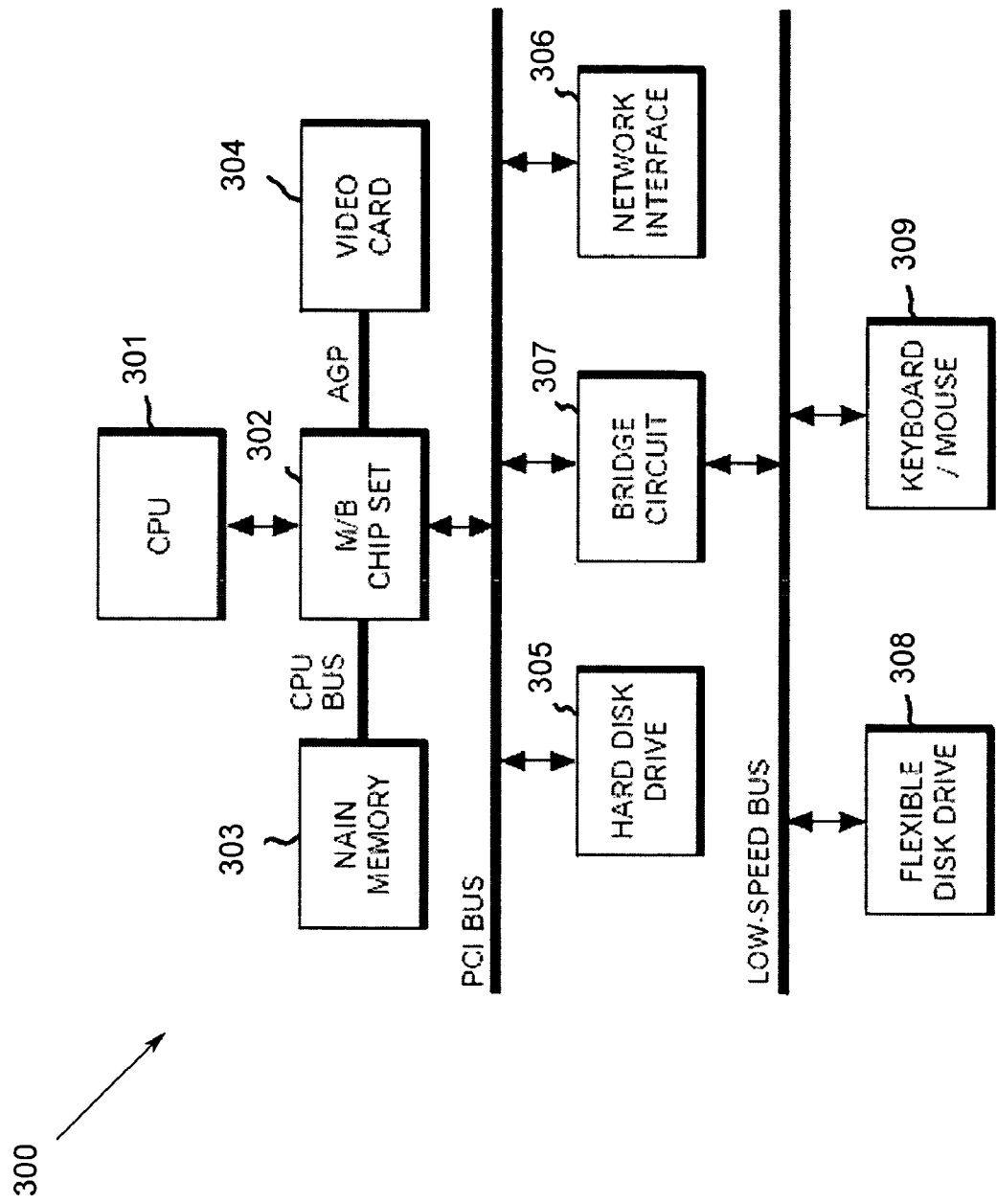
FIG. 3 is a schematic diagram showing an example of a hardware configuration of a computer suitable as the wholesale server and the agent server in a system according to the embodiment.

FIG. 3 is a schematic diagram showing an example of a hardware configuration of a computer device 300 according to an embodiment of the present invention. A computer device 300 according to an embodiment of the present invention may be configured suitable as the wholesale server 110 and/or an agent server in the system illustrated in FIG. 1B. The computer device 300 shown in FIG. 3 includes: a CPU (central processing unit) 301 that is operation means; a main memory 303 which is coupled to the CPU 301 through a M/B (motherboard) chip set 302 and a CPU bus; a video card 304 coupled to the CPU 301 through the M/B chip set 302 similarly and an AGP (accelerated graphics port); a hard disk drive (HDD) 305 and a network interface 306 which are coupled to the M/B chip set 302 through a PCI (peripheral component interconnect) bus; and a flexible disk drive 308 and a keyboard/mouse 309 which are coupled to the M/B chip set 302 through the PCI bus, a bridge circuit 307 and a low-speed bus such as an ISA (industry standard architecture) bus.

Note that FIG. 3 merely exemplifies the hardware configuration of the computer device realizing this embodiment. Therefore, various other configurations can be adopted if this embodiment is applicable thereto. For example, a configuration may be adopted, in which only a video memory is mounted instead of providing the video card 304 and image data is processed by the CPU 301. Moreover, as an external storage unit, a CD-R (compact disc recordable) drive or DVD-RAM (digital versatile disc random access memory) drive may be provided through an interface such as an ATA (AT attachment) and a SCSI (small computer system interface).

Referring to FIG. 1B, the client terminal 130 is a terminal used by a person who wants to purchase a ticket in order to access agent servers 120A-C and the wholesale server 110 to purchase the ticket. The client terminal 130 is realized by an information processor including a network function, such as a portable telephone, a PDA (personal digital assistant) and a kiosk terminal, other than the computer device shown in FIG. 3.

Figure 4:
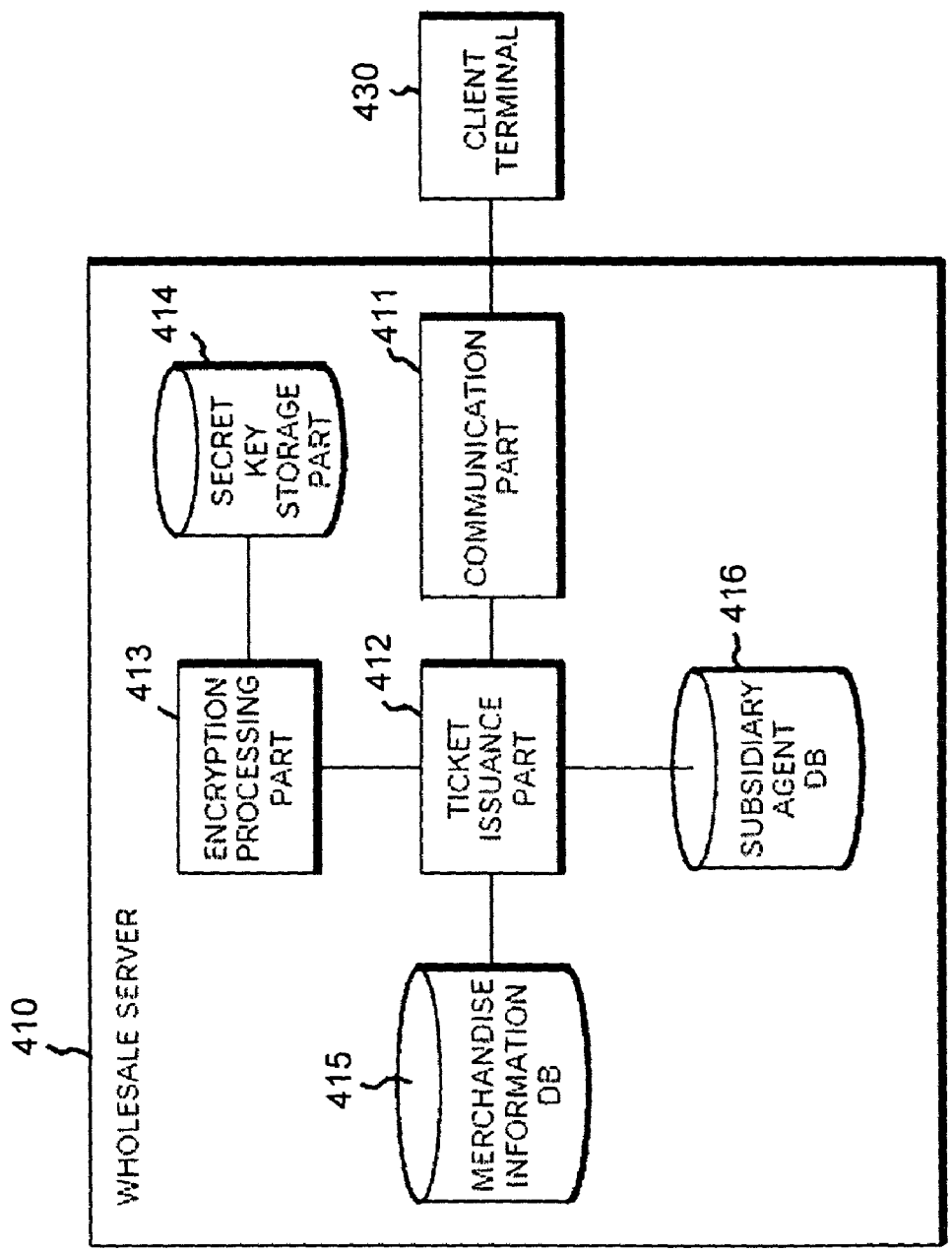
FIG. 4 is a diagram showing a functional configuration of the wholesale server according to the embodiment.

FIG. 4 is a diagram showing a functional configuration of the wholesale server 410 according to an embodiment of the present invention. With reference to FIG. 4, the wholesale server 410 includes: a communication part 411 for performing data communication with a client terminal 430; a ticket issuance part 412 for carrying out processing in ticket management services; and an encryption processing part 413 which performs encryption processing of data to be transmitted and received, and decoding processing thereof. Moreover, the wholesale server 410 further includes: a secret key storage part 414 storing secret keys; a merchandise information database (DB) 415 used for processing of the ticket management services; and a subsidiary agent database (DB) 416 storing information on agents that are positioned directly below the wholesale server 410 having a relationship of trust with each agent.

The communication part 411 is realized by the network interface 306 in FIG. 3, for example. The communication part 411 receives a request from a client terminal 430, gives the request to the ticket issuance part 412, and transmits a response received from the ticket issuance part 412 to a client terminal 430.

The ticket issuance part 412 is realized by the program-controlled CPU 301 and the main memory 303 in FIG. 3, for example, and carries out processing of management services such as issuance, cancellation and inquiries of a ticket in response to the request received from the communication part 411. Moreover, the ticket issuance part 412 gives the communication part 411 a response notifying that procedures for an issued ticket, cancellation and the like are completed, and allows the communication part 411 to transmit the response back to a client terminal 430.

The encryption processing part 413 is realized by the program-controlled CPU 301 and the main memory 303 in FIG. 3, for example, and performs decoding processing of the request received from a client terminal 430 as well as encryption processing of the response to be transmitted to a client terminal 430. For the decoding and encryption processing by the encryption processing part 413, the secret keys stored in the secret key storage part 414 are used.

The secret key storage part 414 is realized by a storage unit such as the hard disk drive 305 and the main memory 303 in FIG. 3, for example, and stores the secret keys used for the encryption and decoding processing by the encryption processing part 413. The secret key storage part 414 stores two kinds of secret keys, and one of them is a secret key shared with an agent server disposed directly below the wholesale server 410 in the tree structure. This secret key is used for the encryption processing part 413 to decode a token created by an agent server disposed directly below the wholesale server 410. The other one is a secret key that the wholesale server 410 uniquely has. This secret key is used for encrypting at least a part of an electronic ticket to be issued by the ticket issuance part 412.

The merchandise information database 415 is realized by a storage unit such as the hard disk drive 305 and the main memory 303 in FIG. 3, for example, and stores management information concerning issuance of a ticket (which seat ticket has been already issued, and the like). Every time performing issuance or cancellation of a ticket in response to a request from a client terminal 430, the ticket issuance part 412 updates information on relevant items in the merchandise information database 415.

The low-level agent database 416 is realized by a storage unit such as the hard disk drive 305 and the main memory 303 in FIG. 3, for example, and stores information concerning an agent server disposed directly below the wholesale server 410. Note that the agent server about which information is registered may be so long as to be positioned directly below the wholesale server 410, and it does not matter if the agent server described above is the agent server of the intermediate agent or the agent server of the terminal agent. If the wholesaler newly makes a consignment contract for ticket sales with a predetermined agent, information concerning an agent server of the agent is added. Meanwhile, if the wholesaler dissolves a contract with an agent with which a consignment contract has been already made, information concerning an agent server of the agent is deleted or information indicating that the agent server is invalid is registered.

Figure 5:
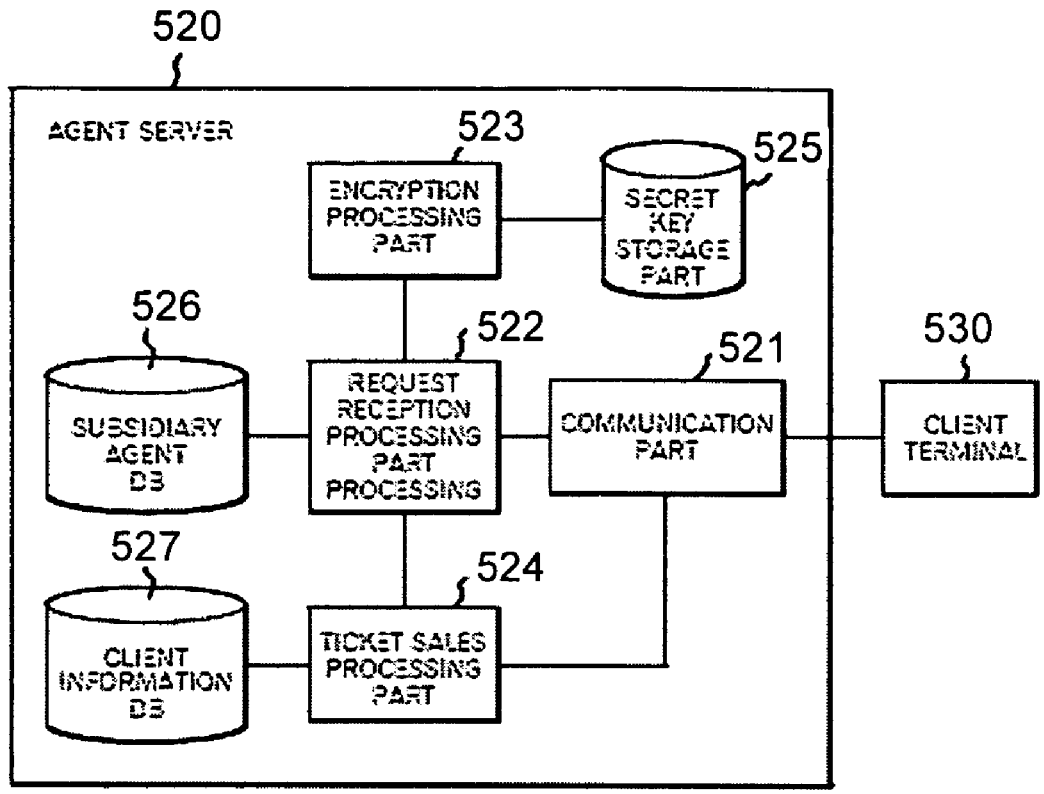
FIG. 5 is a diagram showing a functional configuration of the agent server according to the embodiment.

FIG. 5 is a diagram showing a functional configuration of the agent server 520 according to an embodiment of the present invention. With reference to FIG. 5, the agent server 520 includes: a communication part 521 for performing data communication with the client terminal 530; a request reception processing part 522 which issues a token in response to a request; an encryption processing part 523; and a ticket sales processing part 524 for performing ticket sales services. Moreover, the agent server 520 further includes: a secret key storage part 525 which stores secret keys; a low-level agent database (DB) 526 storing information on an agent, positioned directly below the agent server 520 having a relationship of trust with the agent; and a client information database (DB) 527 storing information on clients to whom tickets are sold.

The communication part 521 is realized by the network interface 306 in FIG. 3, for example. The communication part 521 receives a request from the client terminal 530, gives the request to the request reception processing part 522, and transmits a response received from the request reception processing part 522 to the client terminal 530.

The request reception processing part 522 is realized by the program-controlled CPU 301 and the main memory 303 in FIG. 3, for example, and performs processing by interpreting the request received from the communication part 521. If the request includes a token issued by the agent server 520 directly therebelow, the request reception processing part 522 replaces the current token with a token issued by its own agent server 520. Meanwhile, if the request includes no token, the request reception processing part 522 issues a token, attaches the token to the request, and gives a request without a token to the ticket sales processing part 524. After the processing described above, the request reception processing part 522 gives the communication part 521 the request with the token attached thereto (or replaced) as a response, and allows the communication part 521 to transmit the request back to the client terminal 530.

The encryption processing part 523 is realized by the program-controlled CPU 301 and the main memory 303 in FIG. 3, for example, and performs decoding processing of the request received from the client terminal 530 as well as encryption processing of the response to be transmitted to the client terminal 530. For the decoding and encryption processing by the encryption processing part 523, the secret keys stored in the secret key storage part 525 are used.

The ticket sales processing part 524 is realized by the program-controlled CPU 301 and the main memory 303 in FIG. 3, for example, and executes payment involved in ticket sales. As the ticket sales processing part 524, it is possible to apply an existing online payment system of a credit card, electronic money, transfer of money to a financial institution, and other forms of payment.

The secret key storage part 525 is realized by a storage unit such as the hard disk drive 305 and the main memory 303 in FIG. 3, for example, and stores the secret keys used for the encryption and decoding processing by the encryption processing part 523.

The secret key storage part 525 stores two kinds of secret keys, and one of them is a secret key shared with the agent server 520 directly below its own agent server 520 in the tree structure. This secret key is used for the encryption processing part 523 to decode a token created by the agent server 520 directly therebelow. The other one is a secret key shared with the agent server 520 directly above its own agent server 520 in the tree structure. This secret key is used for encrypting the token created by the request reception processing part 522 if a token is attached to a request from the client terminal 530 or if the request reception processing part 522 replaces the token attached to the request by the agent server 520 directly therebelow with a token of its own. However, if its own server is the agent server 520 of the terminal agent, there exists no agent server 520 below its own server. Thus, a secret key shared with the first agent server 520 directly therebelow is not stored.

The subsidiary agent database 526 is realized by a storage unit such as the hard disk drive 305 and the main memory 303 in FIG. 3, for example, and stores information concerning the agent server 520 directly below its own agent server 520. Note that the agent server 520 about which information is registered may be so long as to be positioned directly below its own server, and it does not matter if the agent server described above is the agent server 520 of the intermediate agent or the agent server 520 of the terminal agent. If its own agent newly makes a consignment contract for ticket sales with another agent, information concerning an agent server 520 of the agent is added. Meanwhile, if its own agent dissolves a contract with a predetermined agent with which a consignment contract has been already made, information concerning an agent server 520 of the predetermined agent is deleted or information indicating that the predetermined agent server 520 is invalid is registered. However, if its own server is the agent server 520 of the terminal agent, there exists no agent server 520 below its own server. Thus, the low-level agent database 526 is no longer required.

The client information database 527 is realized by a storage unit such as the hard disk drive 305 and the main memory 303 in FIG. 3, for example, and stores client (ticket buyer) information acquired by processing by the ticket sales processing part 524.

Figure 6:
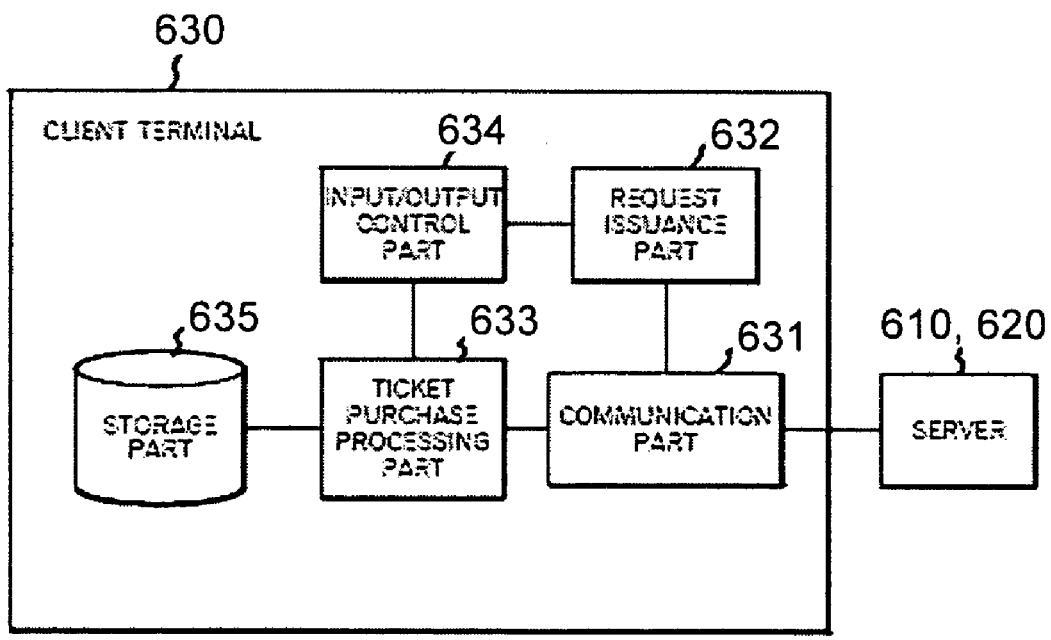
FIG. 6 is a diagram showing a functional configuration of a client terminal according to the embodiment.

FIG. 6 is a diagram showing a functional configuration of the client terminal 630 according to an embodiment of the present invention. With reference to FIG. 6, the client terminal 630 includes: a communication part 631 for performing data communication with the wholesale server 610 and the agent server 620; a request issuance part 632 which generates a ticket purchase request; a ticket purchase processing part 633 which performs various processing for purchasing a ticket; an input/output control part 634 which outputs information to a user and receives an input operation by the user; and a storage part 635.

The communication part 631 is realized by the network interface 306 of FIG. 3 if the client terminal 630 is configured with the computer device shown in FIG. 3. This communication part 631 transmits a request received from the ticket purchase processing part 633 to the agent server 620 or the wholesale server 610. Moreover, the communication part 631 receives a response to be transmitted by the agent server 620 or the wholesale server 610, and gives the response to the ticket purchase processing part 633.

The request issuance part 632 is realized by the program-controlled CPU 301 and the main memory 303 if the client terminal 630 is configured with the computer device shown in FIG. 3. This request issuance part 632 issues a ticket purchase request according to an operation received by the input/output control part 634, gives the request to the communication part 631, and allows the communication part 631 to transmit the request to the agent server 620.

The ticket purchase processing part 633 is realized by the program-controlled CPU 301 and the main memory 303 if the client terminal 630 is configured with the computer device shown in FIG. 3. This ticket purchase processing part 633 gives the communication part 631 a request with a token transmitted from the agent server 620, and allows the communication part 631 to transmit the request to the agent server or the wholesale server 610, which is a destination specified by the token (specifically, a parent server of the agent server 620 which has issued the token). Furthermore, if a ticket is acquired from the wholesale server 610, the ticket purchase processing part 633 stores the ticket in the storage part 635. Moreover, in order to make online payment involved in ticket purchase, the ticket purchase processing part 633 transmits a command for making payment and necessary information to the agent server 620 through the communication part 631.

The input/output control part 634 is realized by the program-controlled CPU 301 and the main memory 303 if the client terminal 630 is configured with the computer device shown in FIG. 3. This input/output control part 634 controls display means, which is configured with the video card 304 shown in FIG. 3 and an unillustrated display unit, to display at which stage a series of processing for purchasing a ticket is or to display a purchase result of the ticket. Moreover, the input/output control part 634 receives an input operation by the user on input means such as the keyboard/mouse 309 as shown in FIG. 3, and allows the ticket purchase processing part 633 to execute processing corresponding thereto.

The storage part 635 is realized by a storage unit such as the hard disk drive 305 and the main memory 303 if the client terminal 630 is configured with the computer shown in FIG. 3. This storage part 635 stores electronic information on a ticket to be finally purchased. Next, description will be given of operations when a ticket is sold by the system including the wholesale server 610, the agent server 620 and the client terminal 630, which are formed as described above.

The following description is given by taking, as an example, the case where the system has the configuration shown in FIG. 1B. In this system, a first ticket purchase request is transmitted from the client terminal 130 to the agent server 120C of the agent C that is the terminal agent. Thereafter, the agent server 120A of the agent A that is the intermediate agent and the wholesale server 110 are sequentially accessed.

Figure 7:
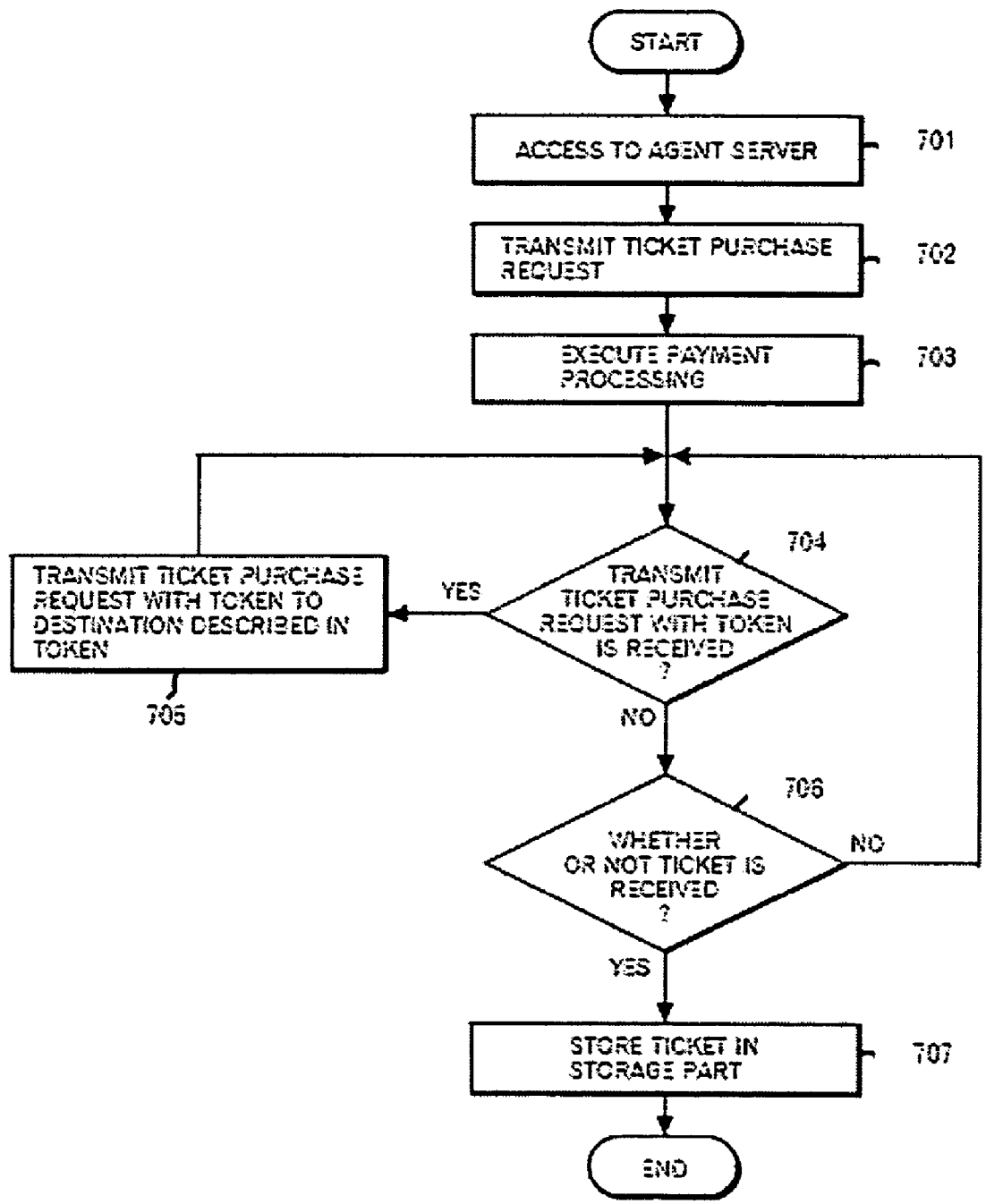
FIG. 7 is a flowchart explaining operations of the client terminal of the embodiment at the time of purchasing a ticket.

FIG. 7 is a flowchart explaining operations of the client terminal at the time of purchasing a ticket according to an embodiment of the present invention. In FIG. 7, a user operates the client terminal to access the agent server 701. Thereafter, when the user selects a desired ticket and performs an operation for purchasing the ticket, the request is transmitted to the agent server 702. The online payment involved in ticket sales is then executed 703. A determination is made whether the transmit ticket purchase request with token is received 704. If yes, The ticket purchase request with token is transmitted to the destination described in the token 705. If not, a decision is made whether a ticket is received 706. If not, the system cycles back to determine whether the transmit ticket purchase request with token is received 704. If yes, the ticket is stored in the storage part 707.

Figure 8:
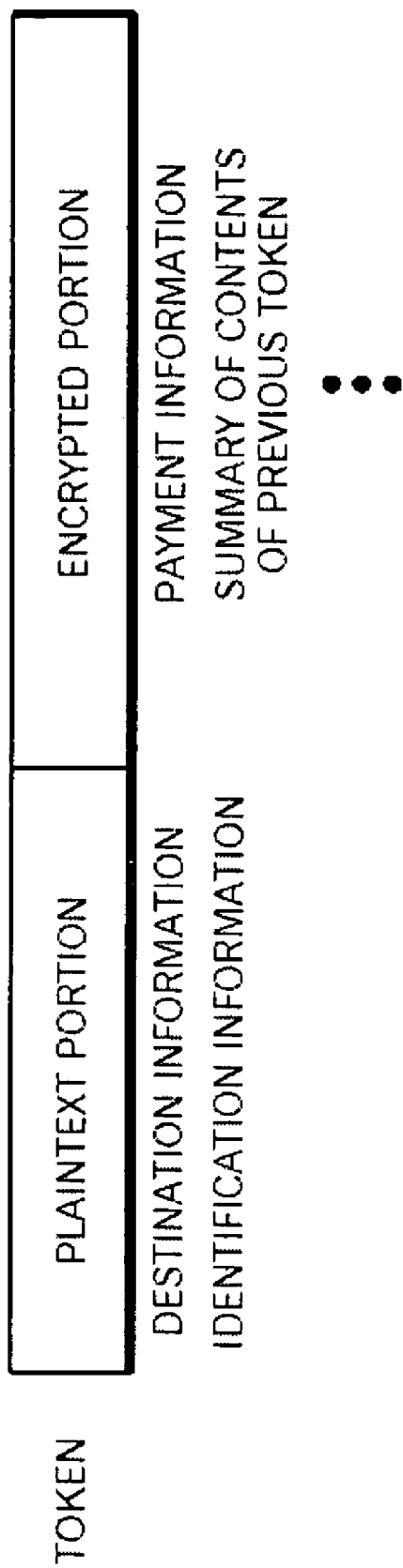
FIG. 8 is a diagram showing an example of a data configuration of a token to be attached to a ticket purchase request in the embodiment.

FIG. 8 illustrates a token according to an embodiment of the present invention. In FIG. 8, the token includes a plaintext portion and an encrypted portion. The plaintext portion may be used to provide destination and identification information. The encrypted portion may be used to provide payment information and a summary of the contents of a previous token.

With reference to the figures described above, a more detailed explanation of the operation of each component will be provided. With reference to FIGS. 1B and 6, when a user selects a desired ticket and performs an operation for purchasing the ticket, the request issuance part 632 generates a ticket purchase request based on the operation received by the input/output control part 634, and transmits the request to the agent server 120C through the communication part 631. In this ticket purchase request, information concerning the type of the desired ticket (a name of an event, date and time when the event will be held, and the like) and information concerning the user are described.

Referring to FIGS. 1B and 5, in the agent server 120C, the request reception processing part 522 receives the ticket purchase request, gives the ticket purchase request to the ticket sales processing part 524, and creates a token to be attached to the ticket purchase request. In this token, described are: the information concerning the user; payment information to be described later; identification information indicating its own server (here, the agent server 120C) which has attached the token; information (destination information) for specifying a high-level server that is a next destination (in this case, the agent server 120A); and the like. Thereafter, the encryption processing part 523 encrypts the information, in the token, other than the destination information and the identification information on its own server, for example, by using a secret key stored in the secret key storage part 525 of FIG. 5 and shared with the agent server 120A.

Meanwhile, the ticket sales processing part 524, which has received the ticket purchase request from the request reception processing part 522, extracts the information concerning the user from the ticket purchase request and stores the information in the client information database 527. Thereafter, the ticket sales processing part 524 exchanges a command and information required for payment, e.g., designation of a method of payment, an amount to be paid, and the like, with the client terminal 530 through the communication part 521 and the online payment involved in ticket sales is then executed. Note that, as described above, for execution of processing concerning the payment described above, the existing online payment system can be used.

After the payment processing is finished by the ticket sales processing part 524, the request reception processing part 522 attaches the created token to the ticket purchase request received from the client terminal 530, and transmits the ticket purchase request with the token back to the client terminal 530 which has transmitted the ticket purchase request.

Referring again to FIGS. 1B and 6, when the client terminal 530 receives the ticket purchase request with the token, which has been transmitted back from the agent server 120C, the ticket purchase processing part 633 reads a next destination described in plaintext in the token. Thereafter, the ticket purchase processing part 633 transmits the ticket purchase request with the token to the agent server 120A.

Again referring to FIGS. 1B and 5, in the agent server 520, the request reception processing part 522 receives the ticket purchase request with the token and gives the request to the encryption processing part 523. The encryption processing part 523 determines by which one of the agent servers 520 directly below the agent server 120A the token is attached, based on the identification information described in plaintext in the token and information on the agent servers 520 directly below the agent server 120A, the information being stored in the low-level agent database 526. Thereafter, the encryption processing part 523 retrieves a secret key shared with the agent server 520, which has attached the token, from the secret key storage part 525, and decodes an encrypted portion of the token by use of the secret key. Here, since the token is attached by the agent server 120C, decoding processing is performed by use of the secret key C shared with the agent server 120C.

Next, the request reception processing part 522 rewrites the identification information, the destination information and the like in the token which has been converted into plaintext by the encryption processing part 523. Moreover, the request reception processing part 522 summarizes the contents of the token before being rewritten and describes the summary in a new token. Thereafter, the encryption processing part 523 encrypts the information other than the destination information in the token by use of a secret key stored in the secret key storage part 525. Since the server above the agent server 120A is the wholesale server 110 this time, a secret key shared by the agent server 120A and the wholesale server 110 is used for encryption.

After the processing described above, the request reception processing part 522 attaches the rewritten token to the ticket purchase request received from the client terminal 130, and transmits the ticket purchase request back to the client terminal 130 which has transmitted the ticket purchase request.

When the client terminal 130 receives the ticket purchase request with the token, which has been transmitted back from the agent server 120A, the ticket purchase processing part 533 reads a next destination described in plaintext in the token. Thereafter, the ticket purchase processing part 533 transmits the ticket purchase request with the token to the wholesale server 110.

Referring to FIGS. 1B and 4, in the wholesale server 410, the ticket issuance part 412 receives the ticket purchase request with the token and gives the request to the encryption processing part 413. The encryption processing part 413 determines by which one of the agent servers directly below the wholesale server 410 the token is attached, based on the identification information described in plaintext in the token and information on the agent servers directly below the wholesale server 410. Thereafter, the encryption processing part 413 retrieves a secret key shared with the agent server, which has attached the token, and decodes an encrypted portion of the token by use of the secret key. Here, since the token is attached by the agent server 120A, decoding processing is performed by use of the secret key A shared with the agent server 120A.

Next, the ticket issuance part 412 searches through the merchandise information database 415 based on the information described in the token which has been converted into plaintext by the encryption processing part 413 and in the ticket purchase request. Thereafter, if there is a ticket corresponding to the ticket purchase request (unless the ticket has been already sold), the ticket issuance part 412 issues the ticket. Subsequently, the encryption processing part 413 encrypts at least a part of the ticket by use of a secret key unique to the wholesale server 410, the secret key being stored in the secret key storage part 414. The ticket issuance part 412 transmits the ticket encrypted by the encryption processing part 413 back to the client terminal 430, which has transmitted the ticket purchase request.

In the above example of the operations, the client terminal 130 receives the ticket purchase request with the token after the payment processing is finished in the agent server 120C. The reason why payment is made in advance in the system as described above is because it is considered to be reasonable that payment is made when the agent server 120C having distributorship for the ticket is first accessed since the client terminal 130 sequentially accesses the agent server 120A and the wholesale server 110 until acquiring the ticket. However, depending on circumstances such as the system configuration, the type of the client terminal 130 and the contents of the ticket to be sold, there is also a case where it is preferable to make payment after the ticket is acquired. In such a case, payment may be made in such a manner that the client terminal 130 stores a first destination to be accessed, accesses again the agent server 120C which has been accessed first after receiving a ticket from the wholesale server 110, and exchanges information with the ticket sales processing part 524 of FIG. 5.

If the client terminal 130 is a portable information terminal such as a portable telephone and a PDA, the stored electronic information is used as a ticket as it is. Moreover, if the client terminal 130 is a kiosk terminal or the like, the stored electronic information is converted into a bar code and the like, and a piece of paper having the bar code printed thereon can be used as a ticket. At the time of using a ticket, validity of the ticket is checked by transferring the electronic information directly to a ticket inspection device from the portable information terminal having the ticket stored therein or by reading code information such as a bar code displayed on a display screen of the portable information terminal and a bar code printed on a piece of paper by use of the ticket inspection device. In the ticket inspection device, the secret key unique to the wholesale server 110 is set, which has been used when the ticket is encrypted in the wholesale server 110. Accordingly, the contents of the ticket are decoded by use of the secret key.

Moreover, when the ticket is issued in the wholesale server 110, the identification information such as a user ID is extracted from the information concerning the user, which is included in the token. This identification information can be encrypted by use of the secret key of the wholesale server 110 itself and included in the ticket. In such a manner, for example, even if a ticket is stolen on a communication path when the ticket is issued, the ticket is verified by decoding the encrypted identification information at the time of using the ticket. Thus, it is possible to prevent a situation of unauthorized use of the ticket by others.

Note that, in the example described above, the wholesale server 110 performs only ticket issuance management. Therefore, a case where the client terminal 130 directly accesses the wholesale server 110 to purchase a ticket is not assumed. However, the wholesale server 110 itself can also directly sell a ticket by receiving a first ticket purchase request (specifically, without a token) from the client terminal 130. In this case, constituent components corresponding to the ticket sales processing part 524 and the client information database 527 in the agent server 520 shown in FIG. 5 are added to the configuration of the wholesale server 10.

Moreover, in the example described above, the description was given by assuming that all the agent servers 120A-C can sell a ticket by receiving a ticket purchase request from the client terminal 130. However, the following operation is also possible. Specifically, the agent server 120 of the intermediate agent, e.g., the agent server 120A in FIG. 1B, only relays a ticket purchase request with a token, and a ticket is sold by the agent server 120 below the agent server 120 of the intermediate agent. In this case, the agent server 120 of the intermediate agent, which does not sell a ticket, no longer needs the ticket sales processing part 524 and the client information database 527 in the configuration shown in FIG. 5. It is clear that the subject matter of the present invention is a technology of shifting a load of transaction processing in an intermediate server to a low-level server in hierarchized servers. Therefore, although the embodiment of ticket sales has been described above, a method of delivering electronic data including various digital contents (music, videos, official personal information and the like) is also included in the subject matter of the present invention.

Figure 9:
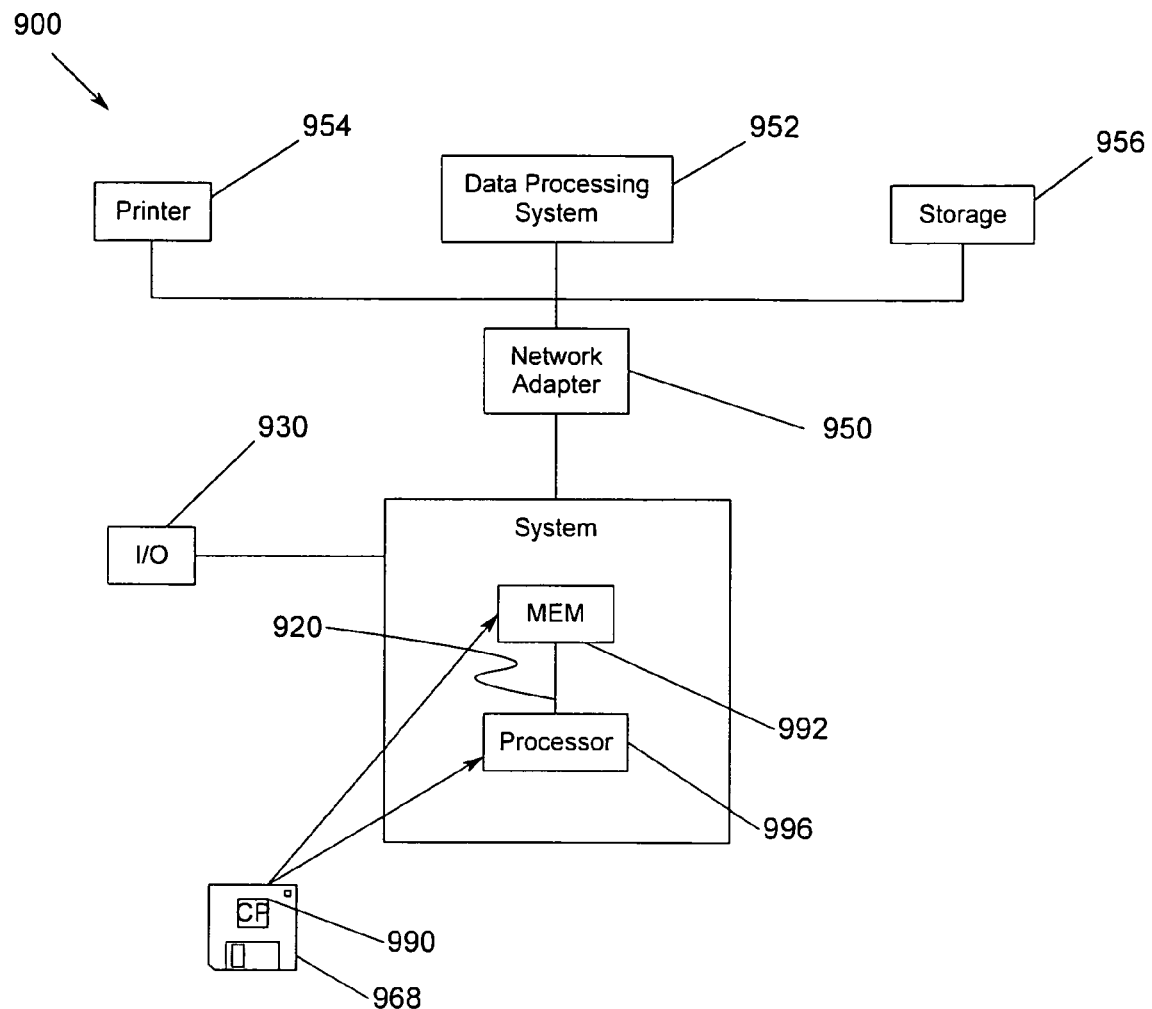
FIG. 9 illustrates a system according to an embodiment of the present invention.

FIG. 9 illustrates a system 900 according to an embodiment of the present invention. Embodiments of the present invention may take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, embodiments of the present invention may take the form of a computer program product 990 accessible from a computer-usable or computer-readable medium 968 providing program code for use by or in connection with a computer or any instruction execution system.

For the purposes of this description, a computer-usable or computer readable medium 968 can be any apparatus that can contain, store, communicate, propagate, or transport the program for use by or in connection with the instruction execution system, apparatus, or device. The medium 968 may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A system suitable for storing and/or executing program code will include at least one processor 996 coupled directly or indirectly to memory elements 992 through a system bus 920. The memory elements 992 can include local memory employed during actual execution of the program code, bulk storage, and cache memories which provide temporary storage of at least some program code in order to reduce the number of times code must be retrieved from bulk storage during execution.

Input/output or I/O devices 930 (including but not limited to keyboards, displays, pointing devices, etc.) can be coupled to the system either directly to the system or through intervening I/O controllers.

Network adapters 950 may also be coupled to the system to enable the system to become coupled to other data processing systems 952, remote printers 954 or storage devices 956 through intervening private or public networks 960 (not shown). Modems, cable modem and Ethernet cards are just a few of the currently available types of network adapters.

Accordingly, the computer program 990 comprise instructions which, when read and executed by the system 900 of FIG. 9, causes the system 900 to perform the steps necessary to execute the steps or elements of the present invention According to the present invention constituted as described above, the client terminal uses the token to sequentially access high-level servers in the tree structure, and finally acquires a ticket by accessing the wholesale server corresponding to the root node. Thus, each of the servers does not have to continue its transaction until the ticket is issued, thereby achieving an effect that a load is reduced.

Moreover, according to the present invention, each of the servers may recognize only a server directly thereabove and therebelow, and the high-level server does not have to manage all the servers therebelow. Thus, it is possible to realize a flexible system that makes it possible to easily change a system configuration by increasing or reducing its own subsidiary agent.

The foregoing description of the embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A data delivery system in a server hierarchy comprising a plurality of servers at various levels in the server hierarchy and at least one remote module adapted to communicate with servers of said server hierarchy, said data delivery system comprising:
   an intermediate level agent server in said server hierarchy, comprising:
      a communication part adapted to perform data communication with a remote module, said performing data communication including receiving input data from said remote module and sending output data to the remote module; and
      a processor, coupled to the communication part, adapted to generate output data in response to receiving said input data from the remote module;
      wherein the input data comprises a data delivery request and a first access token provided by a second agent server in said server hierarchy, for allowing communication by said remote module with said intermediate level agent server and wherein the output data from the intermediate level agent server comprises the data delivery request and a second access token for allowing access by said remote module to another server in said server hierarchy.

2. The data delivery system according to claim 1, further comprising:
   said second agent server which is at a lower level in said server hierarchy than said intermediate level agent server, said lower level agent server comprising:
      a communication part adapted to perform data communication with said remote module, said performing data communication including receiving input data from said remote module and sending output data to the remote module; and
      a processor, coupled to the lower level agent server communication part, adapted to generate output data in response to receiving said input data from the remote module;
      wherein the input data received by the lower level agent server includes an electronic data delivery request by the remote module for the electronic data; and wherein the output data from the lower level agent server comprises the data delivery request and the first access token for allowing access by said remote module to said intermediate level agent server;
   the remote module, the remote module comprising:
      a communication part adapted to perform data communication with servers in said server hierarchy; said performing data communication of said remote module including transmitting input data to servers in said server hierarchy and receiving output data from servers in said server hierarchy; and
      a processor, coupled to the remote module communication part, and adapted to forward output data received from the lower level agent server, to the intermediate level agent server in the form of input data to the intermediate level agent server;
      wherein the output data forwarded by the remote module in the form of input data to the intermediate level agent server includes the electronic data delivery request by the remote module for electronic data and the first access token for allowing access by said remote module to said intermediate level agent server, wherein the processor of the remote module is further adapted to forward output data received from the intermediate level agent server, to a source server in the server hierarchy in the form of input data to the source server; wherein the output data forwarded by the remote module in the form of input data to the source server includes an electronic data delivery request by the remote module for the electronic data and the second access token for allowing access by said remote module to said source server; and
   a source server in the server hierarchy, said source server comprising:

a communication part adapted to perform data communication, said performing data communication including receiving input data from the remote module and associated with an electronic data delivery request by the remote module for electronic data; and a processor, coupled to the source server communication part, and adapted to generate output data in response to receiving said input data from the remote module, wherein the input data received by the source server comprises the electronic data delivery request for the electronic data and the second access token provided by said intermediate level agent server to said remote module for allowing communication by said remote module with said source server, and wherein the output data generated by the source server comprises the electronic data requested by the data delivery request.

3. The data delivery system according to claim 1, further comprising said second agent server which is at a lower level in said server hierarchy than said intermediate level agent server, said lower level agent server comprising:

a communication part adapted to perform data communication with said remote module, said performing data communication including receiving input data from said remote module and sending output data to the remote module; and a processor, coupled to the lower level agent server communication part, adapted to generate output data in response to receiving said input data from the remote module;

wherein the input data received by the lower level agent server includes an electronic data delivery request by the remote module for the electronic data; and wherein the output data from the lower level agent server comprises the data delivery request and the first access token for allowing access by said remote module to said intermediate level agent server.

4. The data delivery system according to claim 3, wherein at least a portion of the first access token is encrypted and the intermediate level agent server processor is adapted to decrypt, the first access token using a secret key that is shared by the intermediate level agent server processor and the lower level agent server that generated the access token.

5. The data delivery system according to claim 3, wherein the lower level agent server further comprises: a secret key storage part storing secret keys shared by the intermediate level agent server and the lower level agent server; and the processor of the lower level agent server includes an encryption processing part adapted to encrypt at least a part of the first access token by use of the secret key stored in the secret key storage part of the lower level agent server.

6. The data delivery system according to claim 3, further comprising the remote module, the remote module comprising:

a communication part adapted to perform data communication with servers in said server hierarchy; said performing data communication including transmitting input data to servers in said server hierarchy and receiving output data from servers in said server hierarchy; and a processor, coupled to the remote module communication part, and adapted to forward output data received from the lower level agent server, to the intermediate level agent server in the form of input data to the intermediate level agent server;

wherein the output data forwarded by the remote module in the form of input data to the intermediate level agent server includes the electronic data delivery request by the remote module for electronic data and the first access token for allowing access by said remote module to said intermediate level agent server.

7. The data delivery system according to claim 6 wherein the remote module processor is adapted to provide a payment function to the lower level agent server for the purpose of acquiring the electronic data.

8. The data delivery system according to claim 6, wherein the processor of the remote module is further adapted to forward output data received from the intermediate level agent server, to a source server in the server hierarchy in the form of input data to the source server; wherein the output data forwarded by the remote module in the form of input data to the source server includes an electronic data delivery request by the remote module for the electronic data and the second access token for allowing access by said remote module to said source server.

9. The data delivery system according to claim 8 wherein the intermediate level agent server further comprises: a secret key storage part storing secret keys; and the processor of the intermediate level agent server includes an encryption processing part adapted to encrypt at least a part of the second access token in the output data by use of a secret key stored in the secret key storage part.

10. The data delivery system according to claim 8, further comprising a source server in the server hierarchy, said source server comprising:

a communication part adapted to perform data communication, said performing data communication including receiving input data from the remote module and associated with an electronic data delivery request by the remote module for electronic data; and a processor, coupled to the source server communication part, and adapted to generate output data in response to receiving said input data from the remote module, wherein the input data received by the source server comprises the electronic data delivery request for the electronic data and the second access token provided by said intermediate level agent server to said remote module for allowing communication by said remote module with said source server, and wherein the output data generated by the source server comprises the electronic data requested by the data delivery request.

11. A program product, comprising: at least one program storage medium having program instructions executable by at least one processing device to perform operations for delivering electronic data in a server hierarchy comprising a plurality of servers at various levels in the server hierarchy and at least one remote module adapted to communicate with servers of said server hierarchy, the operations comprising:

operations by an intermediate level agent serve in the server hierarchy, said intermediate level agent server operations comprising:

receiving input data from said remote module and sending output data to the remote module; and generating output data in response to receiving said input data from the remote module;

wherein the input data comprises a data delivery request and a first access token provided by a second agent server in said server hierarchy, for allowing communication by said remote module with said intermediate level agent server and wherein the output data from the intermediate level agent server comprises the data delivery request and a second access token for allowing access by said remote module to another server in said server hierarchy.

12. The program product of claim 11, wherein said second agent server is at a lower level in said server hierarchy than said intermediate level agent server and wherein the operations further comprise:
  operations by the lower level agent server in the server hierarchy, comprising:
    receiving input data from said remote module and sending output data to the remote module; and
    generating output data in response to receiving said input data from the remote module;
    wherein the input data received by the lower level agent server includes an electronic data delivery request by the remote module for the electronic data; and wherein the output data from the lower level agent server comprises the data delivery request and the first access token for allowing access by said remote module to said intermediate level agent server;
  operations by the remote module comprising:
    transmitting input data to servers in said server hierarchy and receiving output data from servers in said server hierarchy;
    forwarding output data received from the lower level agent server, to the intermediate level agent server in the form of input data to the intermediate level agent server, wherein the output data forwarded by the remote module in the form of input data to the intermediate level agent server includes the electronic data delivery request by the remote module for electronic data and the first access token for allowing access by said remote module to said intermediate level agent server; and
    forwarding output data received from the intermediate level agent server, to a source server in the server hierarchy in the form of input data to the source server, wherein the output data forwarded by the remote module in the form of input data to the source server includes an electronic data delivery request by the remote module for the electronic data and the second access token for allowing access by said remote module to said source server; and
  operations by a source server in the server hierarchy, said source server operations comprising:
    receiving input data from the remote module and associated with an electronic data delivery request by the remote module for electronic data; and
    generating output data in response to receiving said input data from the remote module,
    wherein the input data received by the source server comprises the electronic data delivery request for the electronic data and the second access token provided by said intermediate level agent server to said remote module for allowing communication by said remote module with said source server, and wherein the output data generated by the source server comprises the electronic data requested by the data delivery request.

13. The program product of claim 11, wherein said second agent server is at a lower level in said server hierarchy than said intermediate level agent server, the operations further comprising operations by said lower level agent server in the server hierarchy, said lower level agent server operations comprising:
  receiving input data from said remote module and sending output data to the remote module; and
  generating output data in response to receiving said input data from the remote module;
  wherein the input data received by the lower level agent server includes an electronic data delivery request by the remote module for the electronic data; and wherein the output data from the lower level agent server comprises the data delivery request and the first access token for allowing access by said remote module to said intermediate level agent server.

14. The program product of claim 13, wherein the operations further comprise operations by a remote module, the remote module operations comprising:
  transmitting input data to servers in said server hierarchy and receiving output data from servers in said server hierarchy; and
  forwarding output data received from the lower level agent server, to the intermediate level agent server in the form of input data to the intermediate level agent server;
  wherein the output data forwarded by the remote module in the form of input data to the intermediate level agent server includes the electronic data delivery request by the remote module for electronic data and the first access token for allowing access by said remote module to said intermediate level agent server.

15. The program product of claim 14 wherein the remote module operations further comprise:
  forwarding output data received from the intermediate level agent server, to a source server in the server hierarchy in the form of input data to the source server;
  wherein the output data forwarded by the remote module in the form of input data to the source server includes an electronic data delivery request by the remote module for the electronic data and the second access token for allowing access by said remote module to said source server.

16. The program product of claim 15 wherein the operations further comprising operations by a source server in the server hierarchy, said source server operations comprising:
  receiving input data from the remote module and associated with an electronic data delivery request by the remote module for electronic data; and
  generating output data in response to receiving said input data from the remote module,
  wherein the input data received by the source server comprises the electronic data delivery request for the electronic data and the second access token provided by said intermediate level agent server to said remote module for allowing communication by said remote module with said source server, and wherein the output data generated by the source server comprises the electronic data requested by the data delivery request.

17. The program product of claim 15 wherein the intermediate level agent server operations further comprise:
  storing secret keys a secret key storage part of the intermediate level agent server; and encrypting at least a part of the second access token in the output data by use of a secret key stored in the secret key storage part.

18. The program product of claim 17 wherein at least a portion of the first access token is encrypted wherein the intermediate level agent server operations further comprise decrypting the first access token using a secret key that is shared by the intermediate level agent server processor and the lower level agent server that generated the access token.

19. The program product of claim 18, wherein the lower level agent server operations further comprise:
  storing in a secret key storage part secret keys shared by the intermediate level agent server and the lower level agent server; and
  encrypting at least a part of the first access token by use of the secret key stored in the secret key storage part of the lower level agent server.

20. A method of delivering electronic data in a server hierarchy comprising a plurality of servers at various levels in the server hierarchy and at least one remote module adapted to communicate with servers of said server hierarchy, the method comprising:

operations by the intermediate level agent server, said intermediate level agent server operations comprising:
receiving input data from the remote module and sending output data to the remote module; and
generating output data in response to receiving said input data from the remote module;
wherein the input data comprises a data delivery request and a first access token provided by a second agent server in said server hierarchy, for allowing communication by said remote module with said intermediate level agent server and wherein the output data from the intermediate level agent server comprises the data delivery request and a second access token for allowing access by said remote module to another server in said server hierarchy.

21. The method of claim 20, wherein said second agent server is at a lower level in said server hierarchy than said intermediate level agent server, the method further comprising:

operations by said lower level agent server in the server hierarchy, said lower level agent server operations comprising:
receiving input data from said remote module and sending output data to the remote module; and
generating output data in response to receiving said input data from the remote module;
wherein the input data received by the lower level agent server includes an electronic data delivery request by the remote module for the electronic data; and
wherein the output data from the lower level agent server comprises the data delivery request and the first access token for allowing access by said remote module to said intermediate level agent server.

22. The method of claim 21 further comprising:
operations by a remote module, the remote module operations comprising:
transmitting input data to servers in said server hierarchy and receiving output data from servers in said server hierarchy; and
forwarding output data received from the lower level agent server, to the intermediate level agent server in the form of input data to the intermediate level agent server;
wherein the output data forwarded by the remote module in the form of input data to the intermediate level agent server includes the electronic data delivery request by the remote module for electronic data and the first access token for allowing access by said remote module to said intermediate level agent server.

23. The method of claim 22, further comprising operations by a source server in the server hierarchy, said source server operations comprising:
receiving input data from the remote module and associated with an electronic data delivery request by the remote module for electronic data; and
generating output data in response to receiving said input data from the remote module,
wherein the input data received by the source server comprises the electronic data delivery request for the electronic data and the second access token provided by said intermediate level agent server to said remote module for allowing communication by said remote module with said source server, and wherein the output data generated by the source server comprises the electronic data requested by the data delivery request.

* * * * *